(12) United States Patent
Dirneder et al.

(10) Patent No.: US 9,914,253 B2
(45) Date of Patent: Mar. 13, 2018

(54) CLOSING UNIT OF A SHAPING MACHINE

(71) Applicant: ENGEL AUSTRIA GmbH, Schwertberg (AT)

(72) Inventors: Franz Dirneder, Schwertberg (AT); Stephan Eppich, Arbing (AT); Helmut Wiesinger, Bad Zell (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 18 days.

(21) Appl. No.: 15/175,424

(22) Filed: Jun. 7, 2016

(65) Prior Publication Data

US 2016/0354952 A1     Dec. 8, 2016

(30) Foreign Application Priority Data

Jun. 8, 2015   (AT) .................................. A353/2015

(51) Int. Cl.
*B29C 45/67*     (2006.01)
*B22D 17/26*    (2006.01)
*B29C 45/66*     (2006.01)

(52) U.S. Cl.
CPC .......... *B29C 45/6728* (2013.01); *B22D 17/26* (2013.01); *B29C 45/6707* (2013.01); *B29C 2045/664* (2013.01)

(58) Field of Classification Search
CPC ............ B29C 45/6707; B29C 45/6728; B29C 2045/664; B29C 33/202; B29C 33/24; B22D 17/26; B22D 17/266
See application file for complete search history.

(56) References Cited

U.S. PATENT DOCUMENTS 6,805,827 B2 * 10/2004 Kami ..................... B22D 17/26
                                                                    264/328.1
9,233,498 B2 *   1/2016 Dirneder ................ B29C 45/66

FOREIGN PATENT DOCUMENTS

| AT | 13625 | 5/2014 |
| JP | 2000-185345 | 7/2000 |
| KR | 10-0664877 | 1/2007 |
| KR | 10-2009-0047667 | 5/2009 |

* cited by examiner

*Primary Examiner* — James P MacKey
(74) *Attorney, Agent, or Firm* — Wenderoth, Lind & Ponack, L.L.P.

(57) ABSTRACT

A closing unit of a shaping machine includes a moveable clamping plate, a push rod connected to the moveable clamping plate and having an outside profile, a divided locking nut provided with an inside profile, and a closing force mechanism for acting on the moveable mold clamping plate with a closing force. The push rod is lockable in a closed position of the locking nut by the cooperation of the inside profile and the outside profile with the closing force mechanism. For displacement of the locking nut between an opened and the closed position, a rotary drive is provided for rotation of a shaft, and at least one toothed rack cooperates with the shaft by way of a tooth arrangement and is connected to the locking nut.

17 Claims, 5 Drawing Sheets

CLOSING UNIT OF A SHAPING MACHINE

BACKGROUND OF THE INVENTION

Figure 1:
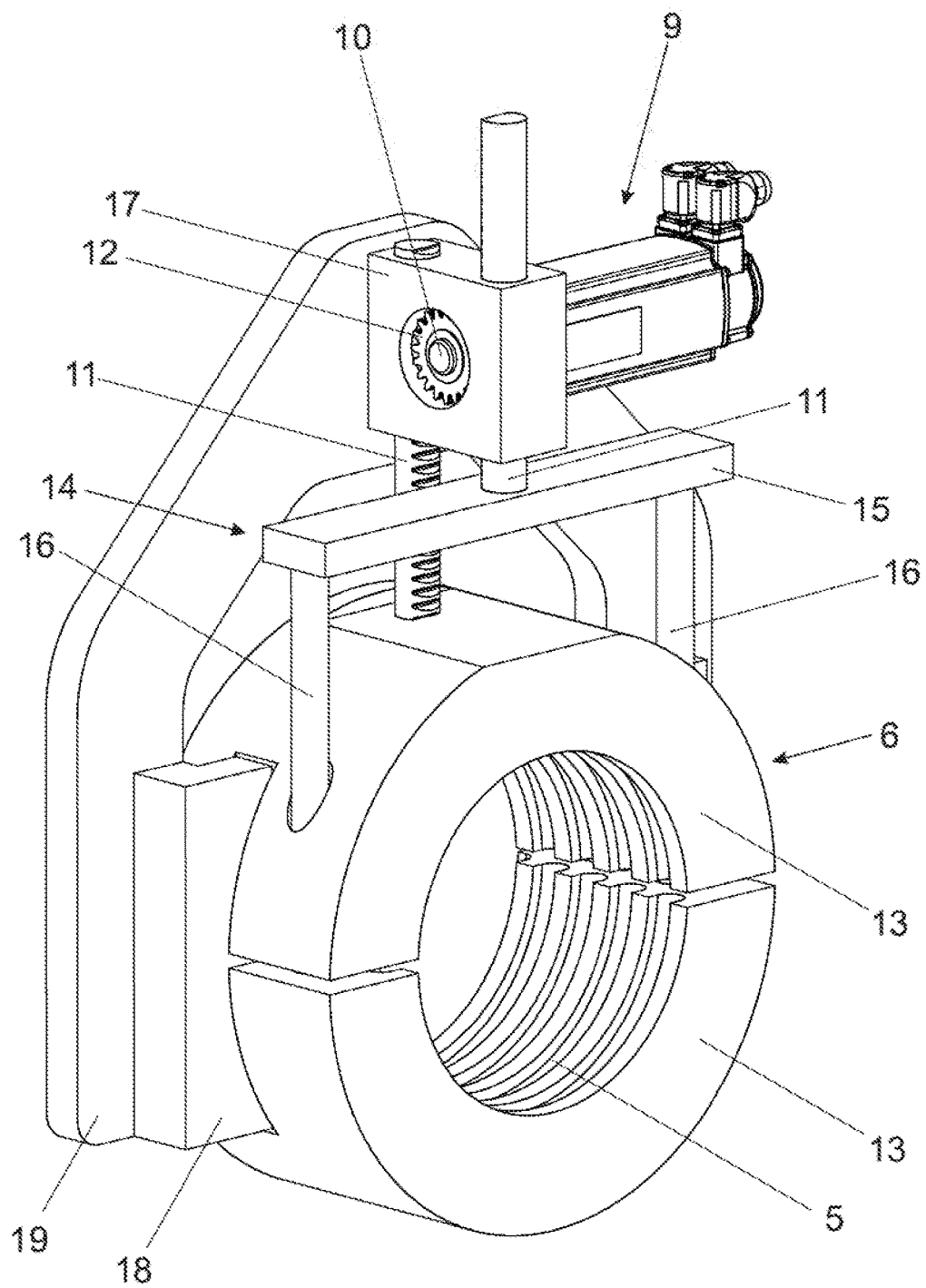

The present invention concerns a closing unit of a shaping machine.

Closing units of the general kind set forth have a moveable clamping plate, a push rod connected to the moveable mounting plate and having an outside profile, a divided locking nut provided with an inside profile, and a closing force mechanism for acting on the moveable mold clamping plate with a closing force.

In that arrangement, in the closed position of the locking nut, the push rod is locked by the cooperation of the inside profile and the outside profile with the closing force mechanism.

A closing unit of the general kind set forth is disclosed, for example, in AT 13625 U1. In that case, the nut halves are displaced by eccentrics fixed to a driven shaft. What is capable of improvement therein is that the shaft and consequently the drive must be oriented parallel to the longitudinal axis of the push rod in order to avoid asymmetrical application of force (gives rise to a risk of jamming) to the divided nut. The structural length of the closing unit is increased as a result. If the attempt is made to orient the drive transversely by a direction-changing transmission, then the number of moveable parts is inevitably increased and the unavoidable play in the transmission reduces the accuracy of open-loop or closed-loop control of the movement of the nut halves.

Closing units having four beam members are not of the general kind set forth. In that case, the beam members are not locked relatively to the closing force mechanism but relatively to the moveable mold clamping plate. Because of the greater number of beam members and the fact that the locking means in this case are arranged at the end of the closing unit, the space situation here is completely different.

SUMMARY OF THE INVENTION

The object of the invention is to provide a closing unit which has a shorter structure in comparison with the state of the art.

That object is achieved in that to displace the locking nut between an opened and the closed position, a rotary drive is provided for rotating a shaft, and at least one toothed rack cooperates by way of a tooth arrangement with the shaft and is connected to the locking nut.

By virtue of the use of toothed racks, it is particularly easily possible for the orientation of the shaft or the rotary drive to be freely selected. As a result, the closing unit can be shorter.

A further advantage lies in the low number of moveable parts and as a consequence thereof longer maintenance intervals for the closing unit.

The tooth arrangement can have a particularly simple configuration insofar as there is provided a gear which is fixed to the shaft and which is motionally coupled to the at least one toothed rack by the tooth arrangement.

It can also be conducive to a simple construction to provide precisely two toothed racks cooperating with the shaft and connected to the locking nut. In that respect, it is particularly advantageously possible to use each side of the gear, in which case naturally an oppositely disposed movement is produced. That opposite movement is necessary to open the locking nut as nut halves must be moved in opposite relationship for opening and closing.

Then each toothed rack can be connected to a nut half, which, as mentioned, represents a particularly simple construction.

Preferably, the rotary drive is in the form of an electric drive—in particular a servo motor. Electric drives, in particular servo motors, are particularly accurate in terms of closed-loop or open-loop control and are therefore highly suited for driving the nut halves.

Furthermore, it can serve for structural simplicity if a bypass element is provided for bypassing the push rod for connecting the at least one toothed rack to the locking nut. In that respect, preferably the bypass element is in the form of a bridge connected to the at least one toothed rack and two bars which are connected to the bridge and the locking nut.

The bypass element, in particular the bars, can in that case serve as a guide for that half of the locking nut, to which the bypass element (in particular the bars) is not connected. In that way, it is possible to provide for guidance of the nut halves, with a very low level of structural complication and expenditure.

The effect of reducing the structural length of the closing unit can be optimized by the shaft being arranged in a plane which is disposed substantially perpendicular to an axis of the push rod and/or by the shaft being arranged substantially horizontally.

The at least one toothed rack can be arranged substantially vertically.

To counteract the wear or a worsening in the tooth coupling between the shaft and the at least one toothed rack, it is possible to provide a housing in which the tooth arrangement is disposed. That can be particularly effective if the housing is at least partially filled with a lubricant and has at least one seal to prevent loss of the lubricant.

The closing unit can preferably be hydraulic.

The closing unit can preferably have precisely one push rod.

Also, a shaping machine can have a closing unit according to the invention.

BRIEF DESCRIPTION OF THE INVENTION

Figure 2:
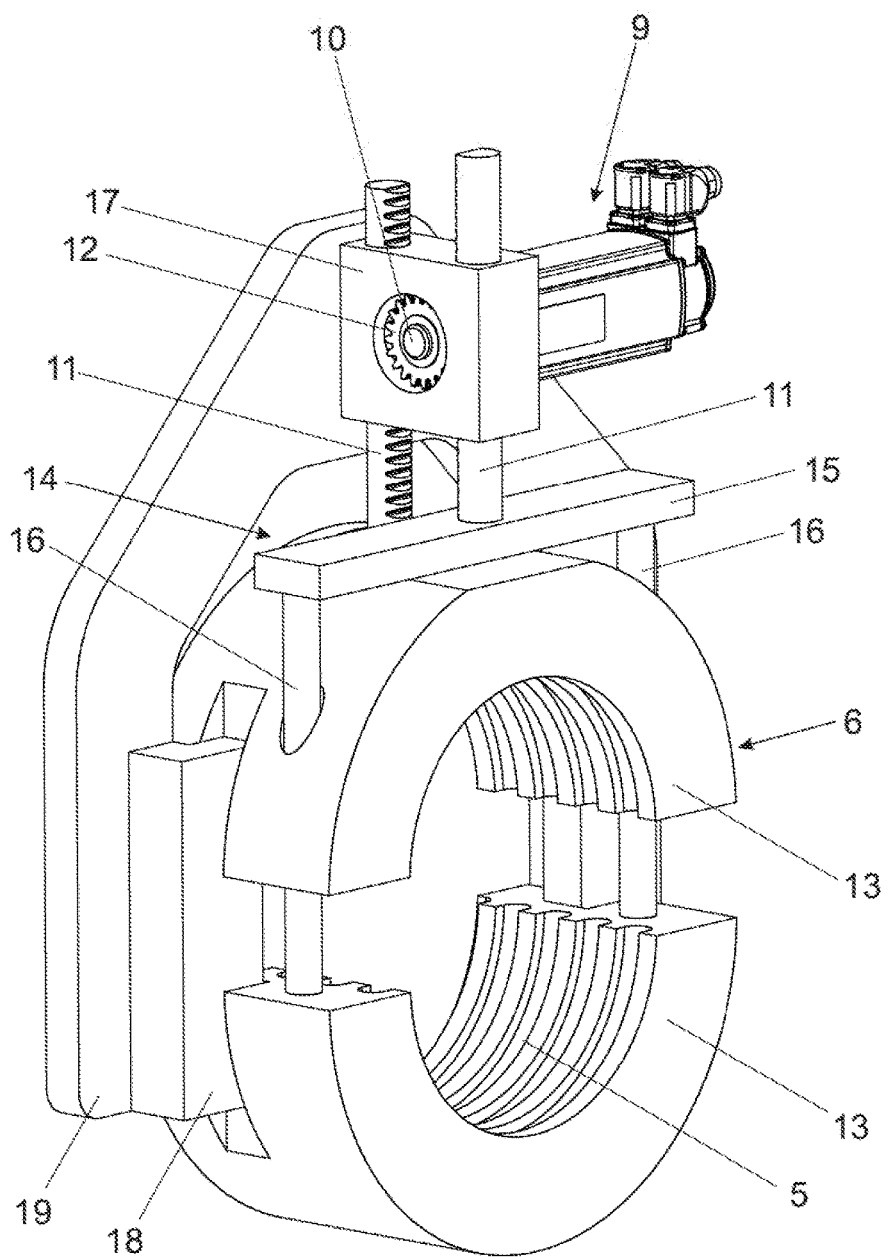
Figure 3:
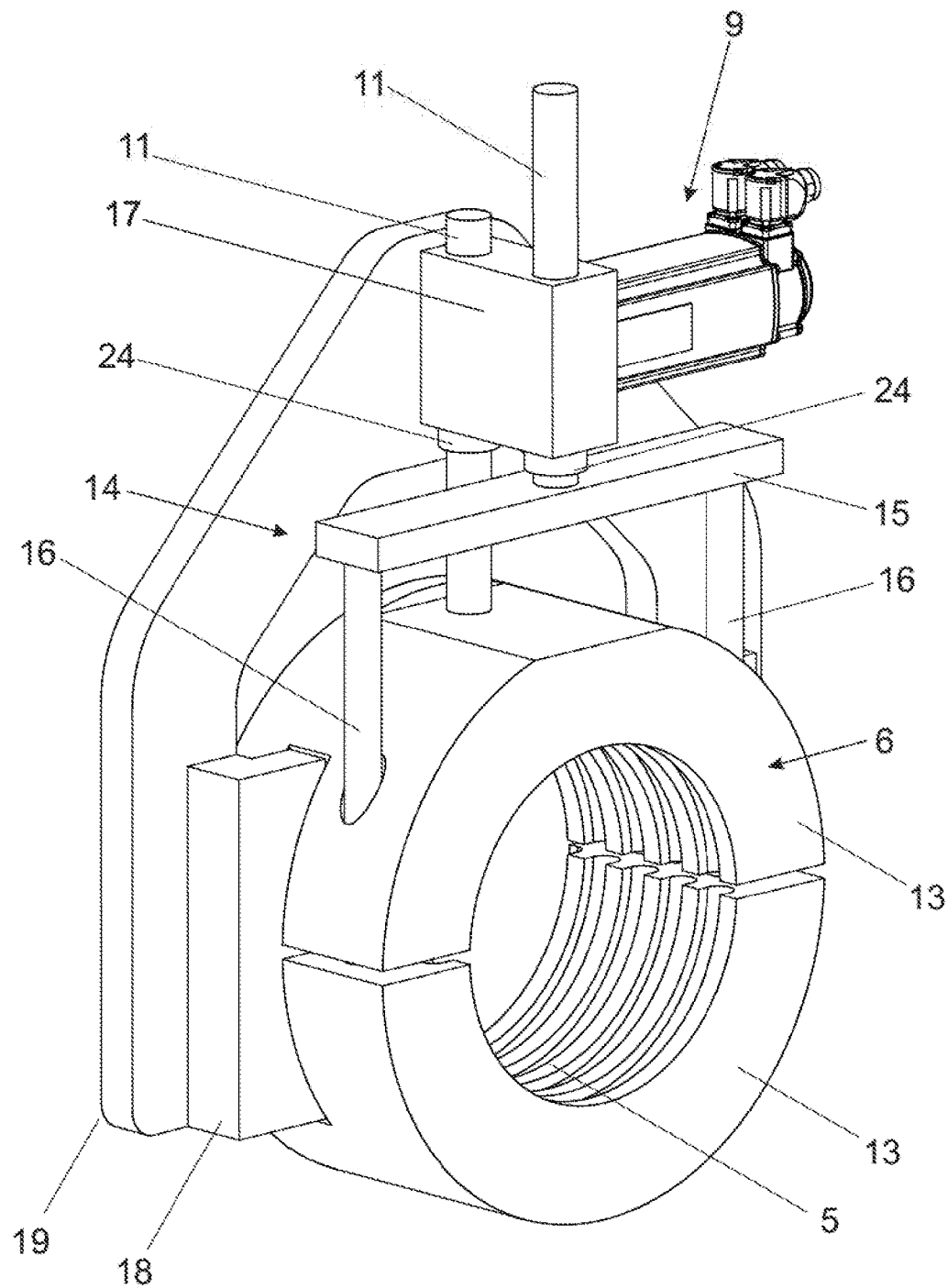
Figure 4:
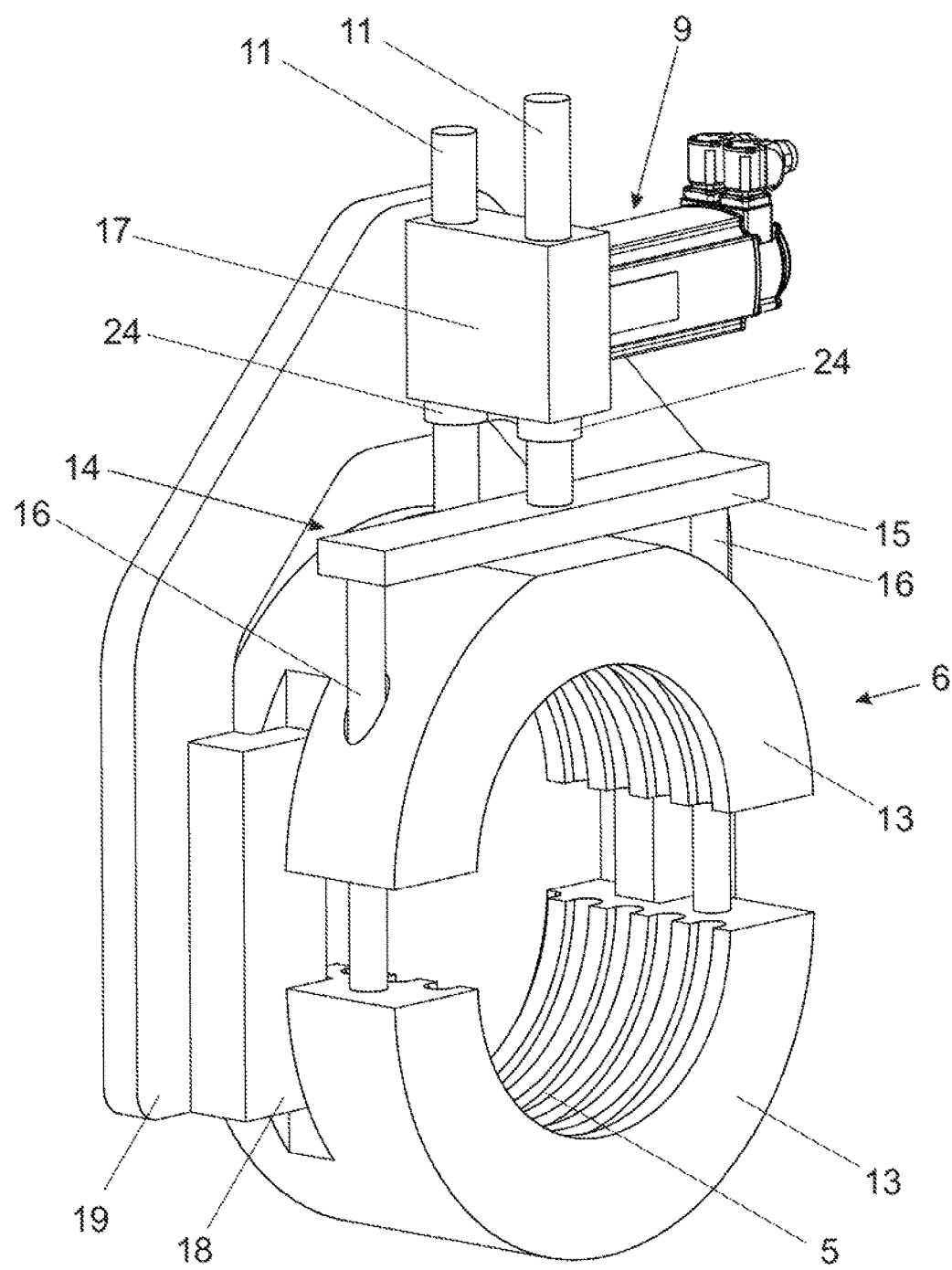
Figure 5:
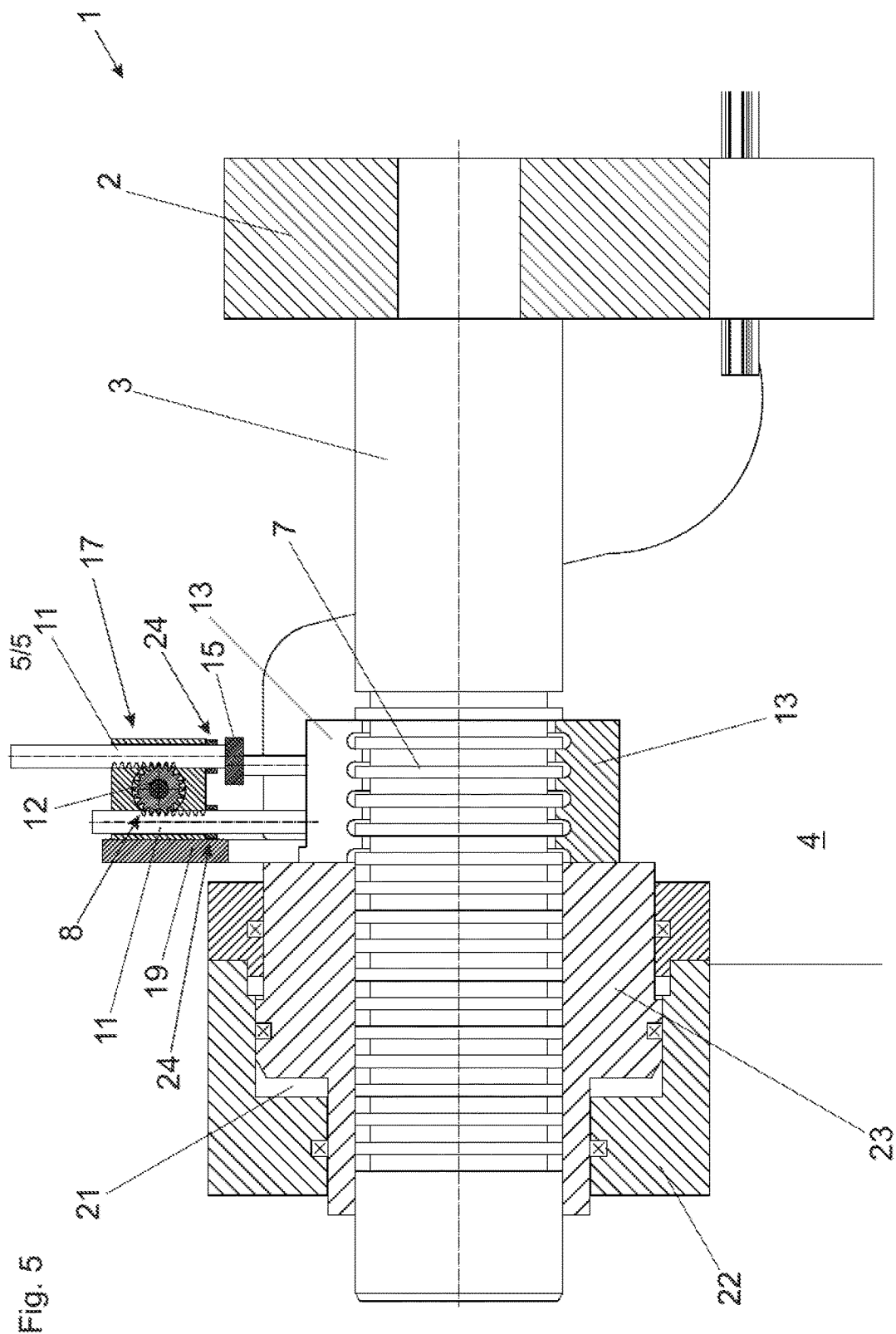

Further advantages and details of the invention will be apparent from the Figures and the related specific description, in which:

FIG. 1 shows a divided nut according to the invention with a toothed rack drive in the closed position, FIG. 2 shows a divided nut according to the invention with a toothed rack drive in the opened position, FIG. 3 shows a second embodiment of a divided nut according to the invention with a toothed rack drive in the closed position, FIG. 4 shows a second embodiment of a divided nut according to the invention with a toothed rack drive in the opened position, and FIG. 5 shows a sectional view of a closing unit according to the invention.

DETAILED DESCRIPTION OF THE INVENTION

FIG. 1 shows a divided nut 6, the halves 13 of which are respectively connected to a toothed rack 11. The toothed racks 11 are driven by a tooth arrangement 8 with the gear 12 by the shaft 10. In this case, the shaft 10 is rotated by the servo motor 9. It is to be noted that the lower half 13 of the locking nut 6 (i.e., lower half in the Figure), is connected to the corresponding toothed rack 11 by a bypass element 14.

That bypass element 14 substantially comprises a bridge 15 and two bars 16. The bars 16 are guided portion-wise by the upper half 13 of the locking nut 6 (i.e., upper half in the Figure). That provides additional guidance for the upper half 13 of the locking nut 6. The gear 12 which cooperates with the toothed racks 11 by the tooth arrangement 8 is disposed in a housing 17. That housing 17 is fixed to a collar 19. The collar 19 is connected to the piston portion 23 of a closing force cylinder or is fixed thereto (see also FIG. 5).

In addition, connected to the collar 19 is a guide 18 cooperating with grooves on the nut halves 13.

FIG. 2 shows the embodiment in FIG. 1, with the divided locking nut 6 opened.

FIGS. 3 and 4 show a further embodiment of the invention (views similar to FIGS. 1 and 2). In this case, the tooth arrangements do not extend over the entire length of the toothed racks 11. That permits the housing 17 to be of a sealed configuration, whereby the tooth arrangement 8 can run in oil.

The housing 17 is therefore filled with lubricant—in this case oil—and is sealed off by the seals 24 to prevent lubricant loss. Because the toothed racks 11 run in oil, wear is reduced and fouling matter does have any access.

FIG. 5 shows the divided nut 6 according to the invention in a closing unit which in this case is hydraulic.

The collar 19 is connected to the piston portion 23 of the closing force cylinder or is fixed thereto. A closing force is exerted on the piston portion 23 of the closing force cylinder by acting on a chamber 21 with a hydraulic fluid (generally oil). In this arrangement, a cylinder portion 22 of the closing force cylinder is fixedly connected to a machine frame 4 (or an end plate). When the divided nut 6 is locked, the closing force can be transmitted from the piston portion 23 of the closing force cylinder to the two halves 13 of the locking nut 6 and further by the inside profile 5 to the outside profile 7 of a push rod 3. The push rod 3 is connected to the moveable clamping plate 2. In that way, the closing force can be transmitted to a mold tool of which one half is fixed to the moveable clamping plate 2.

The invention claimed is:

1. A closing unit of a shaping machine, the closing unit comprising:
    a moveable clamping plate,
    a push rod connected to the moveable clamping plate and having an outside profile,
    a divided locking nut having an inside profile, and
    a closing force mechanism for acting on the moveable clamping plate with a closing force,
    a rotary drive for rotation of a shaft, and
    a toothed rack,
    wherein the push rod is lockable in a closed position of the locking nut by the cooperation of the inside profile and the outside profile with the closing force mechanism, wherein the rotary drive and the toothed rack are configured for displacement of the locking nut between an opened and the closed position, and wherein the toothed rack cooperates with the shaft by a tooth arrangement and is connected to the locking nut.

2. The closing unit as set forth in claim 1, further comprising a gear fixed to the shaft and which is motionally coupled to the toothed rack by the tooth arrangement.

3. The closing unit as set forth in claim 1, wherein the toothed rack is a first toothed rack of precisely two toothed racks cooperating with the shaft and connected to the locking nut.

4. The closing unit as set forth in claim 1, wherein the divided locking nut has two halves.

5. The closing unit as set forth in claim 1, wherein the rotary drive is an electric drive.

6. The closing unit as set forth in claim 1, further comprising a bypass element for bypassing the push rod and connecting the toothed rack to the locking nut.

7. The closing unit as set forth in claim 6, wherein the bypass element includes a bridge connected to the toothed rack and two bars connected to the bridge and to the locking nut.

8. The closing unit as set forth in claim 4, further comprising a bypass element for bypassing the push rod and connecting the toothed rack to the locking nut, wherein the bypass element serves as a guide for a half of the locking nut to which the bypass element is not connected.

9. The closing unit as set forth in claim 1, wherein the shaft is arranged in a plane disposed substantially perpendicular to an axis of the push rod.

10. The closing unit as set forth in claim 1, wherein the shaft is arranged substantially horizontally.

11. The closing unit as set forth in claim 1, wherein the toothed rack is arranged substantially vertically.

12. The closing unit as set forth in claim 1, further comprising a housing in which the tooth arrangement is arranged.

13. The closing unit as set forth in claim 12, wherein the housing is at least partially filled with a lubricant and has at least one seal to prevent loss of the lubricant.

14. The closing unit as set forth in claim 4, wherein the toothed rack is a first toothed rack of at least two toothed racks, each half of the two halves of the locking nut being connected to a respective one of the at least two toothed racks.

15. The closing unit as set forth in claim 5, wherein the rotary drive is a servo motor.

16. The closing unit as set forth in claim 4, further comprising a bypass element for bypassing the push rod and connecting the toothed rack to the locking nut, wherein bars of the bypass element serve as a guide for a half of the locking nut to which the bars are not connected.

17. A shaping machine comprising the closing unit as set forth in claim 1.

* * * * *